(12) United States Patent
Zisimopoulos et al.

(10) Patent No.: US 9,462,523 B2
(45) Date of Patent: Oct. 4, 2016

(54) SELECTIVE ENABLING OF USER EQUIPMENT CAPABILITY

(75) Inventors: Haris Zisimopoulos, Staines (GB); Ricky Kaura, Staines (GB); Song Yean Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 138 days.

(21) Appl. No.: 13/508,424

(22) PCT Filed: Nov. 5, 2010

(86) PCT No.: PCT/KR2010/007799
§ 371 (c)(1),
(2), (4) Date: May 7, 2012

(87) PCT Pub. No.: WO2011/056019
PCT Pub. Date: May 12, 2011

(65) Prior Publication Data
US 2012/0224563 A1   Sep. 6, 2012

(30) Foreign Application Priority Data

Nov. 6, 2009 (GB) .................................. 0919494.5

(51) Int. Cl.
*H04W 36/12* (2009.01)
*H04W 36/14* (2009.01)
(Continued)

(52) U.S. Cl.
CPC .............. *H04W 36/12* (2013.01); *H04W 8/22* (2013.01); *H04W 36/14* (2013.01); *H04W 36/24* (2013.01); *H04W 36/36* (2013.01); *H04W 48/18* (2013.01); *H04W 88/06* (2013.01)

(58) Field of Classification Search
CPC . H04W 36/12; H04W 36/147; H04W 36/24; H04W 36/36
USPC ................ 370/216, 252, 328–335, 354, 389; 455/415, 422.1, 436, 442, 458
See application file for complete search history.

(56) References Cited

U.S. PATENT DOCUMENTS

2006/0063560 A1   3/2006 Herle
2006/0189331 A1*  8/2006 Lundsjo et al. .............. 455/458
(Continued)

FOREIGN PATENT DOCUMENTS

CN    101472311 A    7/2009
CN    101472313 A    7/2009
(Continued)

*Primary Examiner* — Joshua Kading
(74) *Attorney, Agent, or Firm* — Jefferson IP Law, LLP

(57) ABSTRACT

User equipment for use in a wireless network, the wireless network including a first radio access network supporting communication using a first radio access technology in first service areas and a second radio access network supporting communication using a second radio access technology in second service areas, the user equipment having a capability to communicate using the first radio access technology, and a capability to communicate using the second radio access technology that may be disabled or enabled, wherein the user equipment is arranged to disable the capability to communicate using the second radio access technology in response to a determination that a preferred mode of voice communication cannot be provided using the second radio access technology in a said second service area, and wherein the user equipment is arranged to enable the capability to communicate using the second radio access technology, on the basis of communications, using the first radio access technology, in a selected one of said first service areas.

20 Claims, 6 Drawing Sheets

|    | UE Capabilities |        |      | Adjacent MME capabilities |      | Configuration data and indicator |                          |
|----|-----------------|--------|------|---------------------------|------|----------------------------------|--------------------------|
|    | CS              | VoIMS  | CSFB | VoIMS                     | CSFB | Enable E-UTRAN indicator         | Combined TA/LA update    |
| 1  | Pref.           | Sec.   | ✓    | ✓                         | ✓    | ✓                                | ✓                        |
| 2  | Sec.            | Pref.  | ✓    | ✓                         | ✓    | ✓                                | X                        |
| 3  | X               | ✓      | X    | ✓                         | ✓    | ✓                                | X                        |
| 4  | ✓               | X      | ✓    | ✓                         | ✓    | ✓                                | ✓                        |
| 5  | Pref.           | Sec.   | ✓    | X                         | ✓    | ✓                                | ✓                        |
| 6  | Sec.            | Pref.  | ✓    | X                         | ✓    | ✓                                | ✓                        |
| 7  | X               | ✓      | X    | X                         | ✓    | X                                | n/a                      |
| 8  | ✓               | X      | ✓    | X                         | ✓    | ✓                                | ✓                        |
| 9  | Pref.           | Sec.   | ✓    | ✓                         | X    | ✓                                | X                        |
| 10 | Sec.            | Pref.  | ✓    | ✓                         | X    | ✓                                | X                        |
| 11 | X               | ✓      | X    | ✓                         | X    | ✓                                | X                        |
| 12 | ✓               | X      | ✓    | ✓                         | X    | X                                | n/a                      |
| 13 | any             | any    | any  | X                         | X    | X                                | n/a                      |

(51) Int. Cl.
  *H04W 36/24* (2009.01)
  *H04W 36/36* (2009.01)
  *H04W 8/22* (2009.01)
  *H04W 48/18* (2009.01)
  *H04W 88/06* (2009.01)

(56) References Cited

U.S. PATENT DOCUMENTS

| | | | |
|---|---|---|---|
| 2009/0247165 A1* | 10/2009 | Chen et al. | 455/436 |
| 2010/0098023 A1* | 4/2010 | Aghili et al. | 370/331 |
| 2010/0113024 A1* | 5/2010 | Wu | 455/436 |
| 2010/0279677 A1* | 11/2010 | Dwyer et al. | 455/422.1 |
| 2010/0317375 A1* | 12/2010 | Burbidge et al. | 455/458 |
| 2010/0329243 A1* | 12/2010 | Buckley et al. | 370/352 |
| 2010/0329244 A1* | 12/2010 | Buckley et al. | 370/352 |
| 2011/0002327 A1* | 1/2011 | Dwyer et al. | 370/352 |
| 2011/0014919 A1* | 1/2011 | Otte et al. | 455/442 |
| 2011/0194505 A1* | 8/2011 | Faccin et al. | 370/329 |
| 2012/0071163 A1* | 3/2012 | Klingenbrunn | H04W 48/18 455/435.2 |
| 2012/0163301 A1* | 6/2012 | Jang | 370/328 |

FOREIGN PATENT DOCUMENTS

| | | |
|---|---|---|
| CN | 101472319 A | 7/2009 |
| EP | 1 895 799 A1 | 3/2008 |
| EP | 2 497 328 A2 | 9/2012 |
| KR | 10-2006-0110066 A | 10/2006 |
| WO | 01/50804 A1 | 7/2001 |
| WO | 2007/080444 A1 | 7/2007 |
| WO | 2008/017328 A1 | 2/2008 |

\* cited by examiner

| UE Capabilities | | | Adjacent MME capabilities | | Configuration data and Indicator | |
|---|---|---|---|---|---|---|
| CS | VoIMS | CSFB | VoIMS | CSFB | Enable E-UTRAN indicator | Combined TA/LA update |
| 1 | Pref. | Sec. | ✓ | ✓ | ✓ | ✓ | ✓ |
| 2 | Sec. | Pref. | ✓ | ✓ | ✓ | ✓ | X |
| 3 | X | ✓ | X | ✓ | ✓ | ✓ | X |
| 4 | ✓ | X | ✓ | ✓ | ✓ | ✓ | ✓ |
| 5 | Pref. | Sec. | ✓ | X | ✓ | ✓ | ✓ |
| 6 | Sec. | Pref. | ✓ | X | ✓ | ✓ | ✓ |
| 7 | X | ✓ | X | X | ✓ | X | n/a |
| 8 | ✓ | X | ✓ | X | ✓ | ✓ | ✓ |
| 9 | Pref. | Sec. | ✓ | ✓ | X | ✓ | X |
| 10 | Sec. | Pref. | ✓ | ✓ | X | ✓ | X |
| 11 | X | ✓ | X | ✓ | X | ✓ | X |
| 12 | ✓ | X | ✓ | ✓ | X | X | n/a |
| 13 | any | any | any | X | X | X | n/a |

SELECTIVE ENABLING OF USER EQUIPMENT CAPABILITY

TECHNICAL FIELD

The present invention relates generally to wireless networks, and more specifically to a method and apparatus for the selective enabling of the capability of a user equipment to communicate using a radio access technology in a wireless network.

BACKGROUND ART

Wireless networks, in which a user equipment (UE) such as a mobile handset communicates via wireless links to a network of base stations or other wireless access points connected to a telecommunications network, have undergone rapid development through a number of generations of radio access technology. The initial deployment of systems using analogue modulation has been superseded by second generation (2G) digital systems such as GSM (Global System for Mobile communications), typically using GERA (GSM Enhanced Data rates for GSM Evolution Radio Access) radio access technology, and these systems have themselves been replaced by or augmented by third generation (3G) digital systems such as UMTS (Universal Mobile Telecommunications System), using the UTRA (Universal Terrestrial Radio Access) radio access technology. Third generation standards provide for a greater throughput of data than is provided by second generation systems; this trend is continued with the proposals by the Third Generation Partnership Project (3GPP) of the Long Term Evolution (LTE) system, using E-UTRA (Evolved UTRA) radio access technology, which offers potentially greater capacity and additional features compared with the previous standards.

Note that the term "GERA" is used herein to refer to the radio access technology associated with GERAN (GERA networks), "UTRA" is used to refer to the radio access technology associated with UTRAN (UTRA networks), and similarly the term "E-UTRA" or "LTE" is used to refer to the radio access technology associated with E-UTRAN (E-UTRA networks).

LTE deployments may not support voice communication in all service areas, as in some service areas these may support data communication alone. LTE is designed primarily as a high speed packet switched network, and voice services, packet switched voice services and in particular Voice over Internet Protocol Multimedia Subsystem (VoIMS) services are envisaged, whereas previous generation systems such as UMTS support voice services that are primarily circuit switched.

As new technology is introduced, networks are typically deployed which include radio access networks that use a radio access technology according to a recent standard and also legacy radio access networks that use a legacy radio access technology, and furthermore there may be features that are not available in certain service areas. It is thus desirable for a user equipment to be capable of communication using two or more radio access technologies, so for example the user equipment is able operate using one radio access technology, perhaps offering high capacity, where this is available, but being able to operate using a legacy radio access technology, in those service areas of the network that do not support the other radio access technology, or that do not support preferred features.

DISCLOSURE OF INVENTION

Technical Problem

In service areas where a radio access network, such as an LTE/E-UTRA network, does not support voice communication, it is proposed for a user equipment to follow a defined procedure to fall back temporarily to using another radio access network, such as UTRAN or GERAN, for voice communications, typically falling back to circuit switched voice communications. A circuit switched fall back feature is described, for example, in 3GPP specification TS 23.272. Such a defined fallback procedure may include re-enabling a connection to the original radio access network, such as LTE, when a circuit switched connection is no longer required. However, the defined fallback procedure may not be supported in some service areas and/or by the user equipment due to capabilities of the network equipment serving these areas.

When the defined fallback procedure is not supported, the user equipment, particularly voice-centric user equipment (in which voice service is prioritized over data services), may re-select to a first radio access network using a radio access technology offering a voice service, typically carrier switched voice, by using a reselect procedure rather than a defined fallback procedure. When doing so, the user equipment may disable the capability to communicate using the second radio access technology, in order to prevent unwanted reselection. However, the mechanisms whereby the disabled capability is re-enabled are limited, and since the user equipment lacks access to the second radio access network cannot poll whether the service areas in proximity support the desired voice communication technology. As a result, capability to communicate using the radio access technology may remain disabled until the user equipment is powered off and on, or the user equipment changes the operating mode through user intervention. Services, such as LTE services, using the second radio access technology, will be unavailable for this period, even if the user equipment were to be moved to a service area where the services were supported.

Solution to Problem

In accordance with a first aspect of the present invention, there is provided user equipment for use in a wireless network, the wireless network including a first radio access network supporting communication using a first radio access technology in first service areas and a second radio access network supporting communication using a second radio access technology in second service areas, the user equipment having a capability to communicate using the first radio access technology, and a capability to communicate using the second radio access technology that may be disabled or enabled, wherein the user equipment is arranged to disable the capability to communicate using the second radio access technology in response to a determination that a preferred mode of voice communication cannot be provided using the second radio access technology in a said second service area, and wherein the user equipment is arranged to enable the capability to communicate using the second radio access technology, on the basis of communications, using the first radio access technology, in a selected one of said first service areas.

An advantage of using the first radio access technology for communications with the user equipment, on the basis of which communications the capability to communicate using the second radio access technology is enabled, is that communication using the first radio technology may be already established and so reattachment to a second radio access network is not required for the communications to take place.

It is not obvious to enable the capability to communicate using the second radio access technology on the basis of communications, using the first radio access technology, since the communications may convey information relating to the second radio access network that is not conventionally available to the first radio access network.

Preferably, the user equipment is arranged to receive, using the first radio access technology, an indicator which indicates that the second radio access network is arranged to support said preferred mode of voice communication using the second radio access technology in a said second service area related to said selected one of the first service areas, and to enable the capability to communicate using the second radio access technology on the basis of receipt of the indicator.

An advantage of enabling the capability to communicate using the second radio access technology on the basis of receipt of an indicator is that the UE, in particular a UE configured to give preference to voice communication over data communication, may enable the capability to communicate using the second radio access technology only when it is likely that it can be used for voice communication in an area, typically a nearby area, so preventing unwanted network attach procedures to the second radio access network and reducing power consumption by limiting use of a transceiver for the second radio access technology to those situations in which it is likely to be used for voice communication.

Preferably, said indicator is received in response to communications with the user equipment in said selected one of the first service areas, with the advantage that the location of the user equipment is known to be in said selected one of the first service areas.

Preferably, said selected one of the first service areas is adjacent to or overlapping said related second service area, with an advantage that the indicator indicates that voice communication using a preferred mode of communication is likely to be possible in the vicinity of the user equipment.

Preferably, said second service areas are tracking areas, wherein the user equipment is arranged to receive and process configuration data, using the first radio access technology, the configuration data including one or more identifiers of tracking areas arranged to support said preferred mode of voice communication, and wherein the user equipment is arranged to initiate a network attach procedure in a tracking area based on said one or more identifiers.

An advantage of initiating a network attach procedure in a tracking area based on said one or more identifiers, is that when the second radio access technology can be used only to initiate an attachment procedure in those tracking areas that support the preferred mode of voice communications.

Preferably, said preferred mode of voice communication comprises a packet switched voice service, and further preferably said packet switched voice service comprises a Voice over Internet Protocol Multimedia Subsystem service.

Preferably, the capability to communicate using the second radio access technology relates to a packet switched voice service, and the user equipment, when the capability to communicate using the second radio access technology is disabled, is arranged to use a circuit switched voice service provided using the first radio access technology.

An advantage of this is that the user equipment may use the circuit switched voice service provided by the first radio access technology switched service instead of the preferred packet switched voice service provided using the second radio access technology in service areas in which the packet switched service voice service is not supported by the second radio access network.

Preferably, said preferred mode of voice communication comprises a circuit switched fall back mode in which the first radio access technology is used for voice communication using a circuit switched voice service and in which the second radio access technology is used for communication using a packet switched service when voice communication is not required.

Thus, if circuit switched fall back mode is available, this may be used for the duration of a voice call instead of disabling the capability to communicate using the second radio access technology.

Preferably, the first radio access technology comprises UTRA and/or GERA, and wherein the second radio access technology comprises E-UTRA.

Preferably, said indicator indicates that both the user equipment and the second radio access technology in said second service area support the preferred mode of voice communication, with an advantage that the indicator can indicate both network and user equipment capabilities. User equipment capabilities may be known by the network, for example on the basis of a previous attachment of the user equipment to the second radio access network, the information being passed to the first radio access network for use in generating the indicator.

The availability of either, or both, a packet switched voice service and/or a circuit switched fall back mode, if supported by both the user equipment and the second radio access network, may indicate that the capability to communicate using the second radio access technology at the user equipment should be enabled.

Preferably, said circuit switched fall back mode comprises a mechanism for using the first radio access technology for voice communication using circuit switched service and for enabling communication using the second radio access technology when voice communication is not required, with the advantage that communication using the second radio access technology may take resume after the use of a voice service by fall back to circuit switched service is completed.

Preferably, said packet switched voice service relates to a Voice over Internet Protocol Multimedia Subsystem service.

Preferably, said configuration data includes an indicator which indicates that the user equipment is required to perform a combined tracking area/location area (TA/LA) update after enabling E-UTRA capability.

A TA/LA update is required when Circuit Switched Fall Back is to be used, since the update is used to establish a circuit switched communication, making use of the circuit switched infrastructure of the first radio access network.

In accordance with a second aspect of the present invention, there is provided a network part for use in a wireless network, the wireless network including a first radio access network supporting communication using a first radio access technology in first service areas and a second radio access network supporting communication using a second radio access technology in second service areas, the network part being for use in the first radio access network, and the network part being adapted to communicate with user equipment in a selected one of said first service areas, the user equipment having a capability to communicate using the first radio access technology, and a capability to communicate using the second radio access technology that may be disabled or enabled, the user equipment being arranged to disable the capability to communicate using the second radio access technology in response to a determination that a preferred mode of voice communication cannot be provided using the second radio access technology in a said second service area, wherein the network part is arranged to send to the user equipment, using the first radio access technology, configuration data, the configuration data including an indicator that a second network part in the second radio access network is arranged to support a preferred mode of voice communication using the second radio access technology in a said second service area related to said selected one of the first service areas, whereby to enable the capability of the user terminal to communicate using the second radio access technology on the basis of the configuration data received, using the first radio access technology, from the network part Preferably, said network part is arranged to determine said preferred mode of voice communication according to data relating to a configuration of the user equipment and according to data relating to a mode or modes of voice communication supported by the second radio access technology in the said second service area, with an advantage that the amount of information that is required to be sent to the user equipment is reduced.

Preferably, said network part is arranged to receive said data relating to a configuration of the user equipment from a network part associated with the second radio access network, with an advantage that data previously derived from the user equipment using the second radio access technology may be used by the first network part.

Preferably, said indicator is transmitted in response to communications with the user equipment in said selected one of the first service areas.

Preferably, said selected one of the said first service areas is adjacent to or overlapping said related second service area.

Preferably, said second service areas are tracking areas, wherein the configuration data includes one or more identifiers of tracking areas arranged to support said preferred mode of voice communication, whereby to enable the user equipment to initiate a network attach procedure in a tracking area based on said one or more identifiers.

Preferably, the capability to communicate using the second radio access technology relates to packet switched voice technology, and wherein the network part, when the capability to communicate using the second radio access technology is disabled on the user terminal, is arranged to use circuit switched voice technology using the first radio access technology to communicate with the user terminal.

Preferably, the first radio access technology comprises UTRA and/or GERA, and wherein the second radio access technology comprises E-UTRA.

Further features and advantages of the invention will be apparent form the following description of preferred embodiments of the invention, which are given by way of example only.

Advantageous Effects of Invention

An advantage of this is that the user equipment may use the circuit switched voice service provided by the first radio access technology switched service instead of the preferred packet switched voice service provided using the second radio access technology in service areas in which the packet switched service voice service is not supported by the second radio access network.

BRIEF DESCRIPTION OF DRAWINGS

The accompanying figures, similar reference numerals may refer to identical or functionally similar elements. These reference numerals are used in the detailed description to illustrate various embodiments and to explain various aspects and advantages of the present disclosure.

Persons skilled in the art will appreciate that elements in the figures are illustrated for simplicity and clarity and may have not been drawn to scale. For example, the dimensions of some of the elements in the figures may be exaggerated relative to other elements to help to improve understanding of various embodiments of the present disclosure.

MODE FOR THE INVENTION

By way of example an embodiment of the invention will now be described in the context of a wireless network including a radio access network supporting communication using GERA/UTRA radio access technology, as associated with GERAN/UTRAN networks and another radio access network supporting communication using E-UTRA/LTE radio access technology, as associated with E-UTRA networks. However, it will be understood that this is by way of example only and that other embodiments may involve wireless networks using other radio access technologies, such as IEEE802.16 WiMax systems; embodiments are not limited to the use of a particular radio access technology.

Initial deployments of LTE systems are typically deployed within areas of coverage of existing wireless networks, such as legacy GSM and UMTS systems using GERA or UTRA radio access technologies. On initial deployment, the LTE systems may provide service to a smaller geographical area than that covered by existing legacy networks, covering for example city centres, and the areas covered may not be contiguous. Furthermore, only a subset of the available network features may be enabled, and the enablement of features may not be uniform across the network. In particular, due to its potentially enhanced data capacity in comparison with legacy systems, initial deployments of LTE may concentrate on providing high bandwidth data services, for example to LTE enabled equipment such as personal digital assistants (PDAs) or to user equipment in the form of plug in communication modules for laptop computers. For this reason, the primary LTE voice service, a packet switched service known a Voice over IMS (VoIMS), may not be available in certain areas. Furthermore, a mechanism known as circuit switched fall back (CSFB), by which voice calls may be made by temporary use of the legacy network, may not be available in some areas also.

Figure 1:
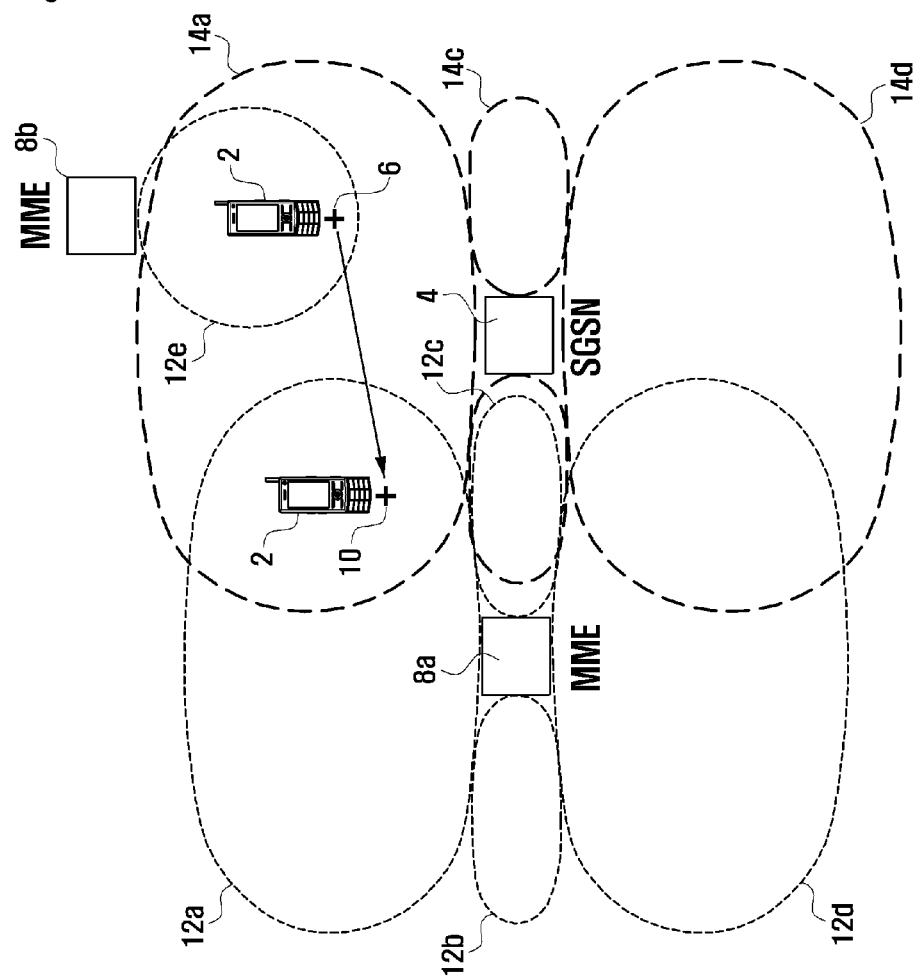
FIG. 1 is a schematic diagram showing a wireless network incorporating parts of a first radio access network and parts of a second radio access network.

A problem that may arise in a situation when neither a packet switched voice service such as VoIMS nor Circuit Switched Fall Back is available, is illustrated by FIG. 1. FIG. 1 shows a user equipment 2 that moves from one position 6 in the area of coverage of a wireless network to another position 10. The wireless network includes a first radio access network (in this embodiment GSM and/or UMTS) supporting communication using a first radio access technology (GERA/UTRA) in first service areas. The area of coverage associated with the serving General Packet Radio System Support Node (SGSN) 4 typically comprises one or more service areas 14*a*, 14*b*, 14*c*, 14*d*, which are known as routing areas (RA) in the context of UTRA. The wireless network also includes a second radio access network (in this embodiment a LTE network) supporting communication using a second radio access technology (E-UTRA) in second service areas. The area of coverage associated with Mobility Management Entity (MME) 8*a* comprises four service areas 12*a*, 12*b*, 12*c*, which are known as tracking areas (TA) in the context of E-UTRA. As drawn in FIG. 1, the area of coverage associated with the MME 8*b* comprises one tracking area 12*e*. At position 6 the user equipment 2 is within a routing area 14*a* of the SGSN 4, and also within the tracking area 12*e* of MME 8*b*.

The user equipment 2 has a capability to communicate using the first radio access technology (UTRA and/or GERA), and also a capability to communicate using the second radio access technology (E-UTRA) that may be disabled or enabled. Typically disabling the capability involves disabling a E-UTRA radio transceiver, or part of a radio transceiver specific to E-UTRA. This may be by powering down parts of the radio, thereby saving power consumption. This may additionally or alternatively involve disabling signal processing functionality, similarly saving power and therefore extending the useful life of a battery charge.

The user equipment 2 is arranged to carry out the disabling of the capability to communicate using the second radio access technology (E-UTRA) in response to a determination that a preferred mode of voice communication cannot be provided using the second radio access technology (E-UTRA) in a second service area (tracking area).

This disabling is particularly applicable to user equipment operating in voice centric mode, which is a mode where priority is given to use the radio access technology that supports voice communication, as opposed to data centric mode, that is to say priority is given to use the radio access technology with the highest possible data rate.

So, referring to FIG. 1, the user equipment 2 at 6 determines that the preferred mode of voice communication cannot be provided using E-UTRA in tracking area 12*e*. The preferred mode of voice communication may for example be a packet switched voice service such as VoIMS or it may be Circuit Switched Fall Back (CSFB), or it may be that either would be equally preferred. In this example, the capability to communicate using the second radio access technology is disabled if neither VoIMS nor Circuit Switched Fall Back can be provided. The inability to provide the preferred communication may be due to both the capabilities of the network in combination with those of the user equipment.

The Circuit Switched Fall Back feature may for example be as in rel 8 of 3GPP SAE, defined in 3GPP specification TS 23.272. Circuit Switched Fall Back, if available, allows a user equipment associated with an E-UTRA radio access network to fall back to using GERA/UTRA for circuit switched voice communication, but then to revert to using the E-UTRA network when the circuit switched connection is no longer required.

In the absence of the VoIMS service, and in the absence of the Circuit Switched Fall Back feature, the user equipment reselects to GERA/UTRA for circuit switched voice communication, rather than following a controlled fall back procedure. To prevent unwanted cell reselection back to E-UTRA, the capability to communicate using E-UTRA is disabled. Disabling of a user equipment's E-UTRA capability is described in 3GPP specification TS 24.301 section 4.5; re-enabling then occurs only when the mode of the user equipment changes from voice centric to data centric, when the user equipment powers off and powers on again, or for the purpose of selection of another network (Public Land Mobile Network). So, the user equipment disables its LTE capability for the entire power cycle unless there is some user interaction that changes the mode of operation or a change in the PLMN.

Referring again to FIG. 1, the user equipment 2 moves to position 10, which is in the tracking area, that is to say service area, 12*a* of MME 8*a*. The LTE radio network supports communication using E-UTRA in tracking area 12*a*, and in this example, a preferred mode of voice communication can be provided using E-UTRA in the tracking area.

However, because the capability to communicate using the second radio access technology is disabled, the user equipment cannot make use of the preferred mode of voice communication.

The determination that the preferred mode of voice communication cannot be provided using E-UTRA may occur when a user equipment performs an initial LTE attach in an area where the voice mechanism configured for the user equipment to use over LTE is not supported, or the determination may occur when a user equipment traverses a service area that does not support the required voice mechanism over UTRA.

In more detail, the sequence of events as represented by FIG. 1 is as follows, assuming that the user equipment is E-UTRA and circuit switched capable.

1. The user equipment 2 at a location 6 in tracking area 12*e* camps in LTE and performs tracking area update, but the MME 8*b* does not support the preferred voice mechanism that is required by the user equipment in tracking area 12*e*.

2. The user equipment 2 reselects to a 2G/3G circuit switched radio access network (such as GSM, UMTS, CDMA2000 (Code division Multiple Access2000), "1×RTT"), the reselection being as defined in 3GPP specification TS 23.221.

3. The routing area 14*a* where the user equipment camps does not support VoIMS. The user equipment performs routing area update (RAU) while disabling E-UTRA capability.

4. The user equipment moves to location 10 in routing area 14*a*, which location is also tracking area 12*a* which overlaps routing area 14*a* and which supports the appropriate voice mechanism over E-UTRA for the user equipment (and in the case of Circuit Switched Fall Back, the RA 14*a* supports this). Given that the user equipment has disabled its E-UTRA capability it cannot read E-UTRA system information and hence cannot reselect back to E-UTRA. In particular, it cannot read the E-UTRA "IMS voice over PS session supported" indicator defined in 3GPP specification TS 24.401. It should be noted that the UTRA equivalent indicator as defined in 3GPP specification TS 24.008 refers to support using UTRA and not E-UTRA.

Figure 2:
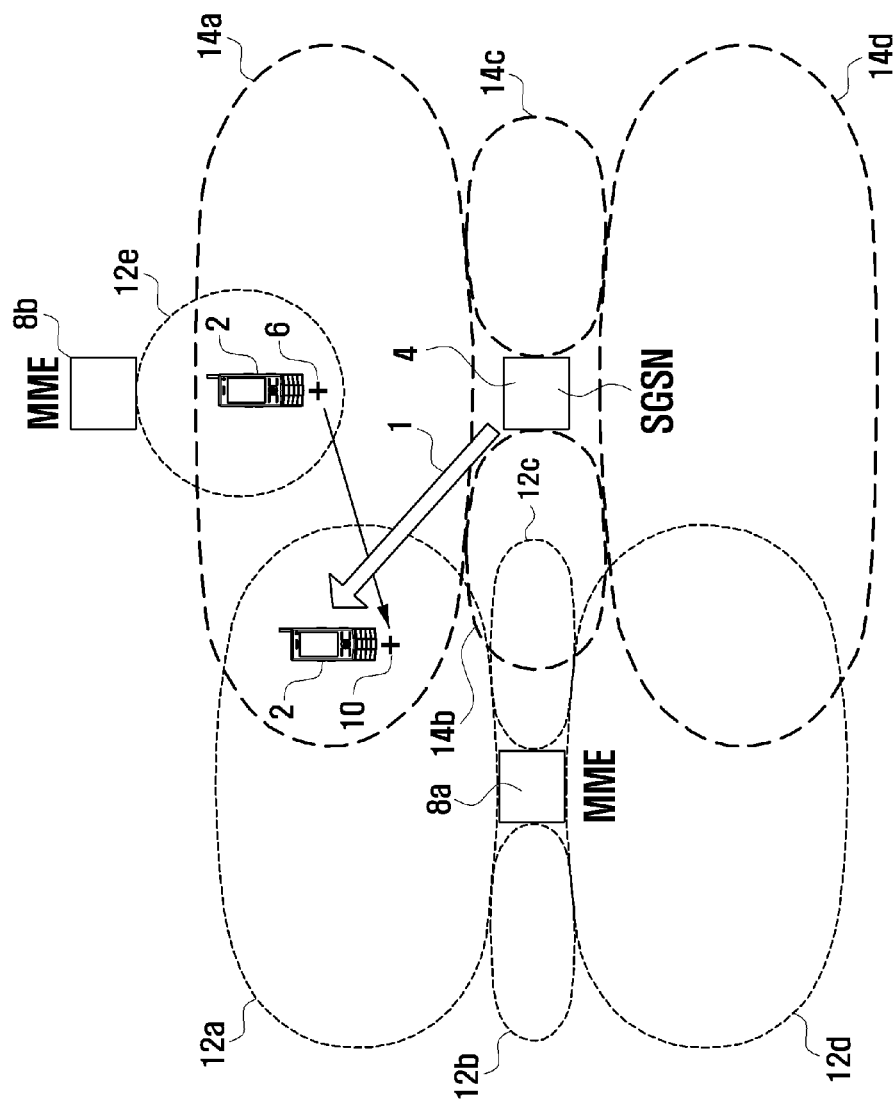
FIG. 2 is a schematic diagram showing a wireless network incorporating parts of a first radio access network and parts of a second radio access network in an embodiment of the invention.

A solution to the problem illustrated by FIG. 1 will be described by reference to FIG. 2.

The user equipment 2 is arranged to enable the capability to communicate using E-UTRA radio access technology, on the basis of communications, using UTRA/GERA radio access technology, in the routing area 14a in which the user equipment is located. That is to say, the user equipment 2 is arranged to receive, using UTRA/GERA, an indicator which indicates that LTE network is arranged to support the preferred mode of voice communication (i.e. VoIMS or Circuit Switched Fall Back) using E-UTRA in a tracking area related to the routing area 14a in which the user equipment is located. In this case the tracking area referred to is tracking area 12a. It can be seen that the tracking area 12a is related to routing area 14a by virtue of overlap of the areas, but only for part of routing area 14a.

The indicator may indicate that there is at least one tracking area in the vicinity of the routing area in which the user equipment is located, and on which the user equipment is camped, that supports the preferred mode of voice communication. It is therefore indicated that the E-UTRA capability should be enabled.

It should be noted that, if the user equipment were located in a part of routing area 14a that was not within tracking area 12a, the E-UTRA capability would be enabled (i.e. the LTE radio turned back on) only to find that the expected preferred mode of voice communication is not available at that location, but at a nearby location. This situation is dealt with by the communication of configuration data to the user equipment using GERA/UTRA that indicates in which tracking areas the user equipment should initiate a network attach procedure once the E-UTRA capability has been enabled, by indicating which tracking areas are arranged to support said preferred mode of voice communication. This prevents the user equipment from initiating a network attach procedure in a tracking area which does not support the preferred mode of voice communication, as this may otherwise lead to the E-UTRA capability being disabled again.

In indicating that the LTE radio access network is arranged to support a preferred mode of voice communication using E-UTRA in a tracking area related to the routing area where the user equipment is located, the indicator indicates attributes of both the user equipment and network. This is because the mode of voice communication that is a preferred mode depends on the configuration of the user equipment. If the user equipment cannot support a mode, it is not preferred. Depending on the configuration of the user equipment, there may be no preferred mode and hence no enablement of the E-UTRA capability.

Figures 3, 4:
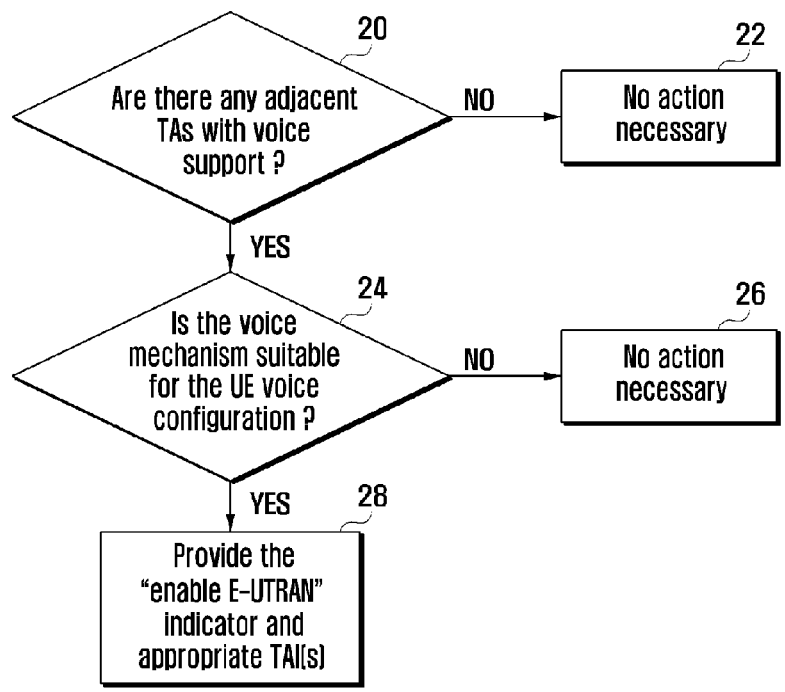
FIG. 3 is a table showing the state of an indicator and configuration data as a function of user equipment capabilities and capabilities available in related service area.
FIG. 4 shows a decision tree relating to the enablement of an indicator, according to an embodiment of the invention.

FIG. 3 is table showing the state of configuration data as a function of user equipment capabilities and capabilities available in related service area, for an LTE capable, voice centric user equipment. The table shows whether or not an "Enable E-UTRA" indicator should be generated (typically at a SGSN), which is the indicator indicating that the LTE radio access network is arranged to support a preferred mode of voice communication using E-UTRA in a tracking area related to the location of the user equipment, and the indicator therefore indicating that E-UTRA capability should be enabled at the user equipment.

In the table, "CS" indicates circuit switched voice. The UE can be configured to prefer circuit switched voice or VoIMS, as indicated in the table. In some cases, as indicated, either CS or VoIMS may not be available.

The column headed "Adjacent MME capabilities" indicates the capabilities in at least some TAs related to the routing area where the user equipment is located.

It can be seen that provided at least one of VoIMS or Circuit Switched Fall Back is supported by both the user equipment and by the LTE network in the given tracking area, the indicator should be enabled.

The decision whether or not to enable the indicator may be made, in this embodiment, at the SGSN 4 serving the user equipment. The information as to the user equipment's capabilities may be passed to the SGSN from a MME to which the user equipment previously communicated configuration data relating to its capabilities and/or preferences by means of a SGSN Context Response message.

In an alternative embodiment, the indicator indicates the capabilities of that the LTE radio access network is arranged to support in terms of modes of voice communication using E-UTRA in the tracking area, and the decision to enable the E-UTRA capability would be taken at the user equipment, taking into account the capabilities of the user equipment.

That is to say, the indicator represents more than one bit of information.

FIG. 3 additionally shows that the configuration data may contain an indicator that indicates that a combined tracking area/location area (TA/LA) update is required, in addition to or instead of tracking area identifiers (not shown in FIG. 3, but assumed present in each case that the E-UTRA enable indicator is generated).

A combined TA/LA update is a procedure whereby, in addition to initiating a tracking area attach to the second radio access network, typically to a TA of an MME, an association with a network entity of the first radio access network related to mobility management is formed, typically to a MSC. Such an association is required in a circuit switched, rather than packet switched, communication, making use of the circuit switched infrastructure of the first radio access network.

So, if Circuit Switched Fall Back is to be used as the mode of voice communication, a combined TA/LA update indicator indicates that the UE is required to perform a combined TA/LA update after enabling E-UTRA capability.

Circuit Switched Fall Back is expected to be used if Circuit Switched Fall Back is supported by the user equipment and by the second radio access technology (E-UTRA) in said second service area (tracking area) and if Circuit Switched Fall Back is preferred over VoIMS at the user equipment and/or VoIMS is not supported by the user equipment and/or the second radio access technology (E-UTRA) in said second service area (tracking area), so the indicator indicates that the UE is required to perform a combined TA/LA update after enabling E-UTRA capability.

An embodiment of the invention may be described in more detail as follows, using terminology well known in the context of 3GPP.

An SGSN indicates to a user equipment to re-enable its LTE capability in the UE/MS (user equipment/mobile station) Network Capability element in the next instance that it performs Mobility Management procedures, on the basis of information on the voice capabilities of the adjacent MME or MME pool that controls the adjacent tracking areas. The SGSN sends a new RAC (routing area code) that will now indicate to the RNC (radio network controller) the support of LTE capabilities for the user equipment and from then on the RNC will be able to provide LTE camping priorities, according to which idle mode camping is allowed to LTE cells. The user equipment re-enables its E-UTRA capability on receipt of the indication, using the preferred voice mechanism according to its configuration.

SGSNs are statically configured with a list of adjacent TAs and also the capabilities in terms of voice support of the MME or MME pool that supports them. The voice support can be either Circuit Switched Fall Back capable or VoIMS capable (i.e. the MME provides the IMS PS Voice Supported Indicator in the MM accept and attach messages as defined in TS 23.401.).

In every RAU (Routing Area Update) the SGSN has to check whether to send an indicator, indicating that the LTE network is arranged to support the preferred mode of voice communication, i.e. Circuit Switched Fall Back or VoIMS using E-UTRA in a TA related to the RA in which the UE is located. The indicator is referred to as "Enable E-UTRA" and is sent the RAU accept, in NAS (Non-Access Stratum) messages, based on the decision tree shown in FIG. 4, taking as input the information shown in table in FIG. 3.

Referring to FIG. 4, the SGSN determines at step 20 whether or not any adjacent tracking areas have voice support. That is to say, the SGSN determines whether any tracking areas adjacent to or overlapping the routing area in which the user equipment is located is arranged to support a mode of voice communication using E-UTRA.

If no adjacent tracking areas have voice support, then no action is necessary by the GGSN (step 22).

If adjacent tracking areas have voice support, then the decision moves to step 24, at which the SGSN determines whether or not the supported mode of voice communication using E-UTRA is a preferred mode. If it is not, no action is necessary by the SGSN (step 26). If it is, then the "Enable E-UTRA" indicator and appropriate tracking area indicators are provided (step 28). The provided "Enable E-UTRA" indicator and appropriate tracking area indicators are then sent to the user equipment. The tracking area indicators indicate tracking areas in which the preferred mode of voice communication is supported.

In addition to the "Enable E-UTRA" indicator and appropriate tracking area indicators, further configuration data may be sent. The combination of the configuration data, further configuration data and the indicator may be referred to as an indicator also, in which case the indicator indicates more than one item of information.

The configuration data may contain an indication of whether, in the MM procedure over E-UTRA after enabling the E-UTRA capability, the UE needs to perform a combined TA/LA Update or normal TAU.

In addition or alternatively, the configuration data may contain a list of TAIs (tracking area identifiers), indicating tracking areas where the preferred mode of voice communication is supported from the MME or the MME pool that serves the tracking areas.

The indicator, that may be the indicator referred to as "Enable E-UTRA", can be part of the of the "Network Feature Support" indicator as defined in 3GPP document TS24.008.

The list of tracking area identifiers can be a new IE (information element) of "Routing Area Identification type".

Figure 5:
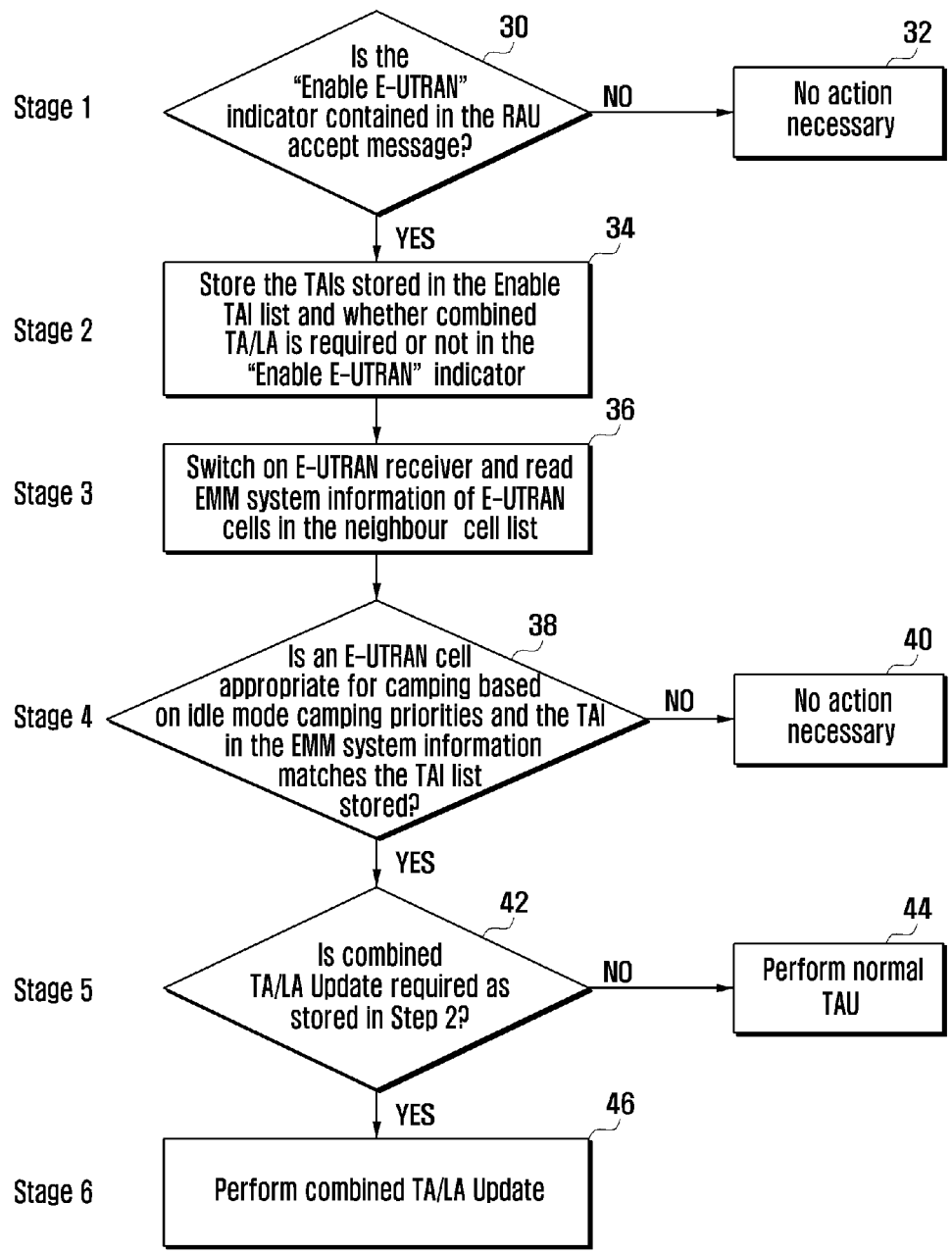
FIG. 5 shows procedures at a user equipment upon receiving an indicator, according to an embodiment of the invention.

FIG. 5 shows procedures at a user equipment upon receiving an indicator, such as "Enable E-UTRA".

At Stage 1, it is determined whether or not the "Enable E-UTRA" indicator is contained in the RAU accept message (step 30), thereby determining that the "Enable E-UTRA" indicator has been received. If not, no action is necessary (step 32). If it is, then the decision moves to Stage 2.

At Stage 2, the appropriate tracking area indicators and the indication that a combined TA/LA update are stored at the user equipment (step 34).

At Stage 3, the capability to communicate using E-UTRA is enabled and E-UTRA configuration information is received (step 36), specifically EMM system information regarding E-UTRAN cells in the neighbour cell list.

At Stage 4, it is determined whether or not an available cell is in a tracking area that corresponds to a received tracking area indicator (step 38). Specifically, it is determined whether an E-UTRAN cell appropriate for camping based on idle mode camping priorities and the TAI in the EMM system information matches the TAI list stored. If not, no action is necessary (step 40). If it is, then it is further determined in Stage 5 whether a combined TA/LA update is required as stored at Stage 2 (step 42). If not, a normal TAU is performed (step 44). If it is, then in Stage 6 a combined TA/LA update is performed (step 46).

Figure 6:
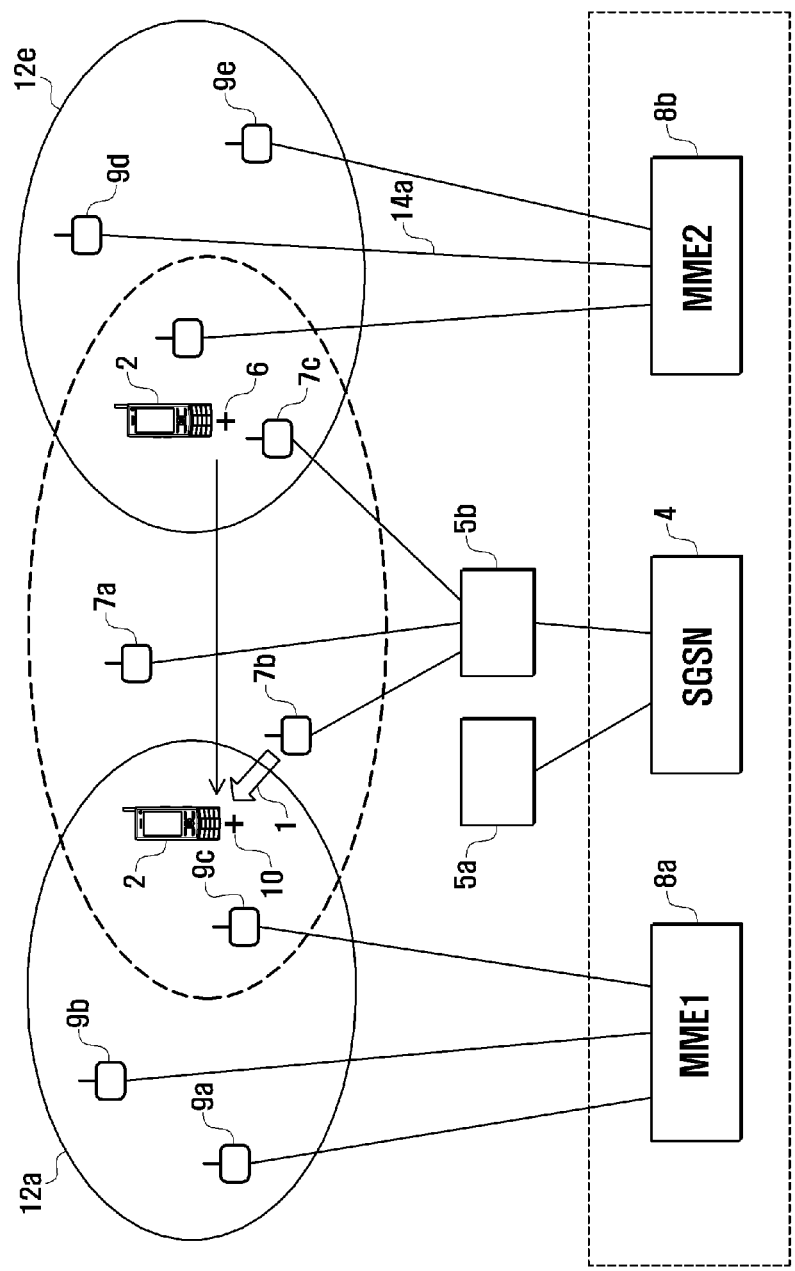
FIG. 6 is a schematic diagram showing a wireless network showing the relationship between core network elements and service areas, according to an embodiment of the invention.

FIG. 6 is a schematic diagram showing a wireless network showing the relationship between core network elements and service areas. The figure relates to similar network elements to those shown in FIG. 2, but includes the parts linking the core network parts (MME1 8a, SGSN 4, and MME2 8b) to the user equipment 2.

It can be seen that each MME 8a, 8b is connected directly to respective eNodeB network elements 9a to 9e, the eNodeB network elements being typically located at a cellular radio cell site (commonly called a base station) and being equipped with radio transceivers for communication with the user equipment 2.

SGSN 4 represents part of a UMTS network, and is connected via RNC (radio network controller) 5b to NodeB network elements 7a to 7b.

It can be seen that tracking area such as 12a typically covers the area of coverage of several eNodeBs.

Figure 7:
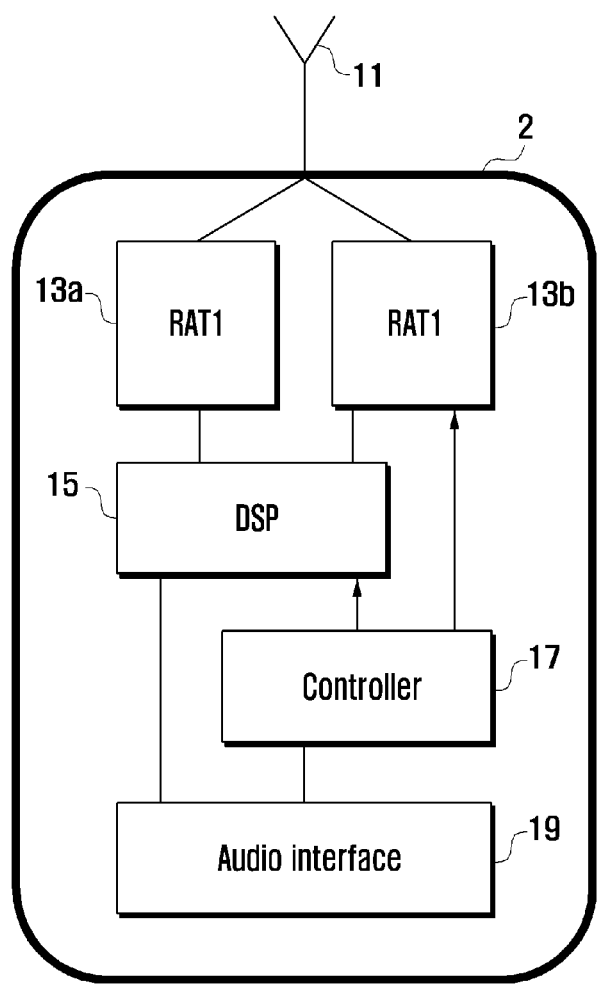
FIG. 7 is a schematic diagram showing a handset according to an embodiment of the invention.

FIG. 7 is a schematic diagram showing a typical handset according to an embodiment of the invention.

Communications using the first radio access technology are received by antenna 11 (a single antenna is shown, but a user equipment may typically have two or more antennas in order to receive MIMO communications). The antenna or antennas are connected to one or more radio transceiver chains shown as RAT1 13a for transceiving a first radio access technology, such as UTRA, and the antenna or antennas are also connected to a radio transceiver chain RAT2 13b for transceiving a second radio access technology, such as E-UTRA.

All or parts of the RAT2 transceiver may be enabled or disabled by a control signal or signals 21 from controller 17. Additionally or alternatively, parts of the digital signal processor relating to communicating using the second radio access technology may be enabled or disabled by the controller 17.

On reception, in the case where the capacity to communicate using the second radio access technology is disabled, communications using the first radio access technology are passed from the receive chain part the RAT1 transceiver 13a to a Digital Signal Processor 15, in which received communications are decoded and the E-UTRA enable indicator is detected and passed to the controller 17. On receiving the E-UTRA enable indicator, the controller enables the capacity to communicate using the second radio access technology in the RAT2 transceiver 13b and/or the digital signal processor 15 as appropriate. Once the capacity to communicate using the second radio access technology in the RAT2 transceiver 13b and/or the digital signal processor 15 is enabled, voice communication can take place using the second radio access technology via audio interface 19, which is connected to digital signal processor 15, which may typically be used for both receiving and transmitting communications.

The above embodiments are to be understood as illustrative examples of the invention. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method of managing a capability of a radio access technology by a user equipment (UE) in a mobile communication system, the method comprising:
   turning off, if a preferred mode of voice communication of the UE is not supported via a first radio access technology in a first location of the UE, a transceiver of the UE for the first radio access technology;
   reselecting a second radio access technology;
   receiving, from a core network node of the second radio access technology in a second location of the UE, information indicating that a first radio access network is arranged to support the preferred mode in a first area of the first radio access technology related to the second location; and
   turning on the transceiver of the UE for the first radio access technology based on the received information.

2. The method of claim 1, further comprising performing an attach procedure to the first access technology in the first area based on the received information.

3. The method of claim 1, wherein the received information is received via the second radio access technology.

4. The method of claim 1, wherein a tracking area is adjacent to or overlaps a second area of the second radio access technology, and the second location is included in the second area.

5. The method of claim 1,
   wherein the preferred mode of voice communication of the UE comprises a packet switched voice service, and
   wherein the packet switched voice service comprises at least one of a Voice over Internet Protocol Multimedia Subsystem (VoIMS) service and a circuit switched fall back mode in which the second radio access technology is used for voice communication using a circuit switched voice service and in which the first radio access technology is used for communication using a packet switched service when voice communication is not required.

6. The method of claim 1,
   wherein the first radio access technology comprises Evolved-Universal Terrestrial Radio Access (E-UTRA), and
   wherein the second radio access technology comprises at least one of Universal Terrestrial Radio Access (UTRA) and Global System for Mobile communications (GSM) Enhanced Data rates for GSM Evolution Radio Access (GERA).

7. The method of claim 1, wherein the received information comprises configuration data which indicates that the UE is required to perform a combined tracking area/location area update after enabling an Evolved-Universal Terrestrial Radio Access (E-UTRA) capability.

8. The method of claim 1, wherein the core network node is a serving general packet radio system support node (SGSN).

9. An apparatus of a user equipment for managing a capability of a radio access technology in a mobile communication system, the apparatus comprising:
   a first transceiver configured to transmit and receive a signal via a first radio access technology;
   a second transceiver configured to transmit and receive a signal via a second radio access technology; and
   a controller configured to control to:
      turn off, if a preferred mode of voice communication of the UE is not supported via the first radio access technology in a first location of the UE, the first transceiver of the UE for the first radio access technology;
      reselect the second radio access technology;
      receive, from a core network node of the second radio access technology in a second location of the UE, information indicating that a first radio access network is arranged to support the preferred mode in a first area of the first radio access technology related to the second location; and
      turn on the first transceiver of the UE for the first radio access technology based on the received information.

10. The apparatus of claim 9, wherein the controller is further configured to perform an attach procedure to the first access technology in the first area based on the received information.

11. The apparatus of claim 9, wherein the received information is received via the second radio access technology.

12. The apparatus of claim 9, wherein a tracking area is adjacent to or overlaps a second area of the second radio access technology, and the second location is included in the second area.

13. The apparatus of claim 9,
   wherein the preferred mode of voice communication of the UE comprises a packet switched voice service, and
   wherein the packet switched voice service comprises at least one of a Voice over Internet Protocol Multimedia Subsystem (VoIMS) service and a circuit switched fall back mode in which the second radio access technology is used for voice communication using a circuit switched voice service and in which the first radio access technology is used for communication using a packet switched service when voice communication is not required.

14. The apparatus of claim 9,
   wherein the first radio access technology comprises Evolved-Universal Terrestrial Radio Access (E-UTRA), and
   wherein the second radio access technology comprises at least one of Universal Terrestrial Radio Access (UTRA) and Global System for Mobile communications (GSM) Enhanced Data rates for GSM Evolution Radio Access (GERA).

15. The apparatus of claim 9, wherein the received information comprises configuration data which indicates that the UE is required to perform a combined tracking area/location area update after enabling an Evolved-Universal Terrestrial Radio Access (E-UTRA) capability.

16. The apparatus of claim 9, wherein the core network node is a serving general packet radio system support node (SGSN).

17. A method of managing a capability of a user equipment (UE) by a core network node in a mobile communication system, the method comprising:

serving the UE using a second radio access technology with a transceiver of the UE for a first radio access technology being turned off;

determining whether at least one adjacent tracking area supports a voice communication via the first radio access technology;

determining, if the adjacent tracking area supports the voice communication, whether a preferred mode of voice communication of the UE is supported in the tracking area of the first radio access technology; and transmitting, if the preferred mode is supported in the tracking area of the first radio access technology, information indicating that the first radio access network is arranged to support the preferred mode in the tracking area, wherein the transceiver of the UE for the first radio access technology is turned on based on the information indicating that the first radio access network is arranged to support the preferred mode in the tracking area.

18. The method of claim 17, wherein the information comprises configuration data which indicates that the UE is required to perform a combined tracking area/location area update after enabling an Evolved-Universal Terrestrial Radio Access (E-UTRA) capability.

19. An apparatus of a core network node for managing a capability of a user equipment (UE) in a mobile communication system, the apparatus comprising:

a transceiver configured to communicate to at least one network node; and a controller configured to control to:

serve the UE using a second radio access technology with a transceiver of the UE for a first radio access technology being turned off;

determine whether at least one adjacent tracking area supports a voice communication via the first radio access technology; and determine, if the adjacent tracking area supports the voice communication via the first radio access technology, whether a preferred mode of voice communication of the UE is supported in the tracking area of the first radio access technology; and transmit, if the preferred mode is supported in the tracking area of the first radio access technology, information indicating that the first radio access network is arranged to support the preferred mode in the tracking area, and wherein the transceiver of the UE for the first radio access technology is turned on based on the information indicating the first radio access network is arranged to support the preferred mode in the tracking area.

20. The apparatus of claim 19, wherein the information comprises configuration data which indicates that the UE is required to perform a combined tracking area/location area update after enabling an Evolved-Universal Terrestrial Radio Access (E-UTRA) capability.

* * * * *